(12) United States Patent
Zha (10) Patent No.: US 12,169,616 B2
(45) Date of Patent: Dec. 17, 2024

(54) TOUCH PANEL AND DISPLAY DEVICE

(71) Applicant: TCL CHINA STAR OPTOELECTRONICS TECHNOLOGY CO., LTD., Shenzhen (CN)

(72) Inventor: Bao Zha, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/770,612

(22) PCT Filed: Mar. 17, 2022

(86) PCT No.: PCT/CN2022/081412
§ 371 (c)(1),
(2) Date: Apr. 20, 2022

(87) PCT Pub. No.: WO2023/168739
PCT Pub. Date: Sep. 14, 2023

(65) Prior Publication Data
US 2024/0143118 A1     May 2, 2024

(30) Foreign Application Priority Data
Mar. 10, 2022 (CN) .......................... 202210233289.6

(51) Int. Cl.
*G06F 3/044*     (2006.01)
*G06F 3/041*     (2006.01)

(52) U.S. Cl.
CPC .......... *G06F 3/0446* (2019.05); *G06F 3/0412* (2013.01); *G06F 3/041662* (2019.05)

(58) Field of Classification Search
CPC .... G06F 3/041; G06F 3/044; G06F 3/041662; G06F 3/0412; G06F 3/0443; G06F 3/04182; G06F 3/04184
See application file for complete search history.

(56) References Cited

U.S. PATENT DOCUMENTS

2015/0091587 A1\* 4/2015 Shepelev .......... G06F 3/041662
324/658
2015/0309634 A1 10/2015 Lee et al.
(Continued)

FOREIGN PATENT DOCUMENTS

CN      103677468 A     3/2014
CN      103927065 A     7/2014
(Continued)

OTHER PUBLICATIONS

PCT International Search Report for International Application No. PCT/CN2022/081412, mailed on Dec. 5, 2022, 8pp.
(Continued)

*Primary Examiner* — Md Saiful A Siddiqui
(74) *Attorney, Agent, or Firm* — The Roy Gross Law Firm, LLC; Roy Gross (57) ABSTRACT

A touch panel and a display device are provided by embodiments of the present application, a self-capacitance module in an original touch panel is replaced with a mutual capacitance module, and a combination of self-capacitance and mutual capacitance is adopted to effectively reduce wiring in the touch panel and to reduce cost at a same time.

20 Claims, 5 Drawing Sheets

(56) References Cited

U.S. PATENT DOCUMENTS

| | | | |
|---|---|---|---|
| 2016/0188106 A1* | 6/2016 | Qiu | G06F 3/0443 |
| | | | 345/174 |
| 2017/0147122 A1* | 5/2017 | Gu | G06F 3/0412 |
| 2019/0056834 A1 | 2/2019 | Blondin et al. | |
| 2020/0097127 A1* | 3/2020 | Kim | G06F 3/04164 |
| 2022/0236307 A1* | 7/2022 | Gray | H03K 5/24 |
| 2022/0283703 A1* | 9/2022 | Kida | G06F 3/0412 |
| 2022/0326810 A1* | 10/2022 | Zhao | G06F 3/0443 |

FOREIGN PATENT DOCUMENTS

| | | |
|---|---|---|
| CN | 104571746 A | 4/2015 |
| CN | 104820532 A | 8/2015 |
| CN | 105094490 A | 11/2015 |
| CN | 110633029 A | 12/2019 |
| CN | 114115613 A | 3/2022 |
| KR | 20220012664 A | 2/2022 |

OTHER PUBLICATIONS

PCT Written Opinion of the International Search Authority for International Application No. PCT/CN2022/081412, mailed on Dec. 5, 2022, 7pp.

Chinese Office Action issued in corresponding Chinese Patent Application No. 202210233289.6 dated Mar. 1, 2024, pp. 1-7, 15pp.

* cited by examiner

TOUCH PANEL AND DISPLAY DEVICE

CROSS REFERENCE TO RELATED APPLICATIONS

This application is a National Phase of PCT Patent Application No. PCT/CN2022/081412 having International filing date of Mar. 17, 2022, which claims the benefit of priority of Chinese Patent Application No. 202210233289.6, filed Mar. 10, 2022, the contents of which are all incorporated herein by reference in their entirety.

FIELD OF DISCLOSURE

The present application relates to a technical field of touch panels, and specifically to a touch panel and a display device.

BACKGROUND OF DISCLOSURE

With development of display technology, more and more functions are integrated into display device, which also gives the display device a new role, as an important interface for human-computer interaction, it is bound to perceive instructions issued by people, and sensors are integrated into the display device as an important bridge for human-computer interaction.

Technical Problem

Current touch sensors, small-sized display devices, such as mobile phones, all use a touch function. Touch technology has developed from on-glass to on-cell until current in-cell mode, development of integrating touch functions into large-screen displays tends to be slow, on-glass method is currently commonly used, while the in-cell has low MOD (Module) thickness, high signal-to-noise ratio, and a narrower frame. At present, a multi-point self-capacitance mode is used in in-cell touch, resulting in an exponential increase in its wiring with an increase in size, which restricts its promotion and application in large sizes.

SUMMARY OF DISCLOSURE

The present application provides a touch panel and a display device, aiming at solving a problem of a plurality of wiring on the touch panel in the prior art.

According to an embodiment of the present application, in one aspect, the present application provides a touch panel, the touch panel comprises:
  at least one first touch area, wherein the at least one first touch area comprises a plurality of self-capacitance modules, the plurality of the self-capacitance modules are independent of each other;
  at least one second touch area, wherein a mutual capacitance module is formed between the at least one second touch area and the at least one first touch area;
  a control module, wherein the plurality of self-capacitance modules of the at least one first touch area are electrically connected with the control module through first connecting wires respectively, and the at least one second touch area is electrically connected with the control module through second connecting wires;
  wherein, a number of the second connecting wires is less than a number of the first connecting wires.

According to an embodiment of the present application, the touch panel comprises one first touch area and one second touch area;
  the first touch area comprises four self-capacitance modules arranged in an array, the second touch area is a complete touch area and independent of the four self-capacitance modules, and the mutual capacitance module is formed between the second touch area and the first touch area formed by the four self-capacitance modules.

According to an embodiment of the present application, the touch panel comprises one first touch area and one second touch area;
  the second touch area comprises a first sub-touch area and a second sub-touch area, the first sub-touch area and the second sub-touch area are two complete and mutually independent sub-touch areas; and the mutual capacitance module is formed between the first sub-touch area and the first touch area, the mutual capacitance module is formed between the second sub-touch area and the first touch area.

According to an embodiment of the present application, the first touch area comprises four self-capacitance modules arranged in an array, the four self-capacitance modules comprise a first self-capacitance module, a second self-capacitance module, a third self-capacitance module, and a fourth self-capacitance module arranged in an array;
  the mutual capacitance module is formed between the first sub-touch area, the first self-capacitance module, and the second self-capacitance module, the mutual capacitance module is formed between the second sub-touch area, the third self-capacitance module, and the fourth self-capacitance module.

According to an embodiment of the present application, the mutual capacitance module is formed between the first sub-touch area and the first self-capacitance module, the mutual capacitance module is formed between the second sub-touch area, the second self-capacitance module, the third self-capacitance module, and the fourth self-capacitance module; or
  the mutual capacitance module is formed between the first sub-touch area and the fourth self-capacitance module, the mutual capacitance module is formed between the second sub-touch area, the first self-capacitance module, the second self-capacitance module, and the third self-capacitance module.

According to an embodiment of the present application, the touch panel comprises one first touch area and one second touch area;
  the second touch area comprises a third sub-touch area, a fourth sub-touch area and a fifth sub-touch area, the third sub-touch area, the fourth sub-touch area, and the fifth sub-touch area are three complete and mutually independent sub-touch areas; and the mutual capacitance module is formed between the third sub-touch area and the first touch area, the mutual capacitance module is formed between the fourth sub-touch area and the first touch area, the mutual capacitance module is formed between the fifth sub-touch area and the first touch area.

According to an embodiment of the present application, the first touch area comprises four self-capacitance modules arranged in an array, the four self-capacitance modules comprise a first self-capacitance module, a second self-capacitance module, a third self-capacitance module, and a fourth self-capacitance module arranged in an array;

the mutual capacitance module is formed between the third sub-touch area and the first self-capacitance module, the mutual capacitance module is formed between the fourth sub-touch area and the second self-capacitance module, the mutual capacitance module is formed between the fifth sub-touch area, the third self-capacitance module, and the fourth self-capacitance module; or the mutual capacitance module is formed between the third sub-touch area and the first self-capacitance module, the mutual capacitance module is formed between the fourth sub-touch area, the second self-capacitance module, and the third self-capacitance module, the mutual capacitance module is formed between the fifth sub-touch area and the fourth self-capacitance module; or the mutual capacitance module is formed between the third sub-touch area, the first self-capacitance module, and the second self-capacitance module, the mutual capacitance module is formed between the fourth sub-touch area and the third self-capacitance module, the mutual capacitance module is formed between the fifth sub-touch area and the fourth self-capacitance module.

According to an embodiment of the present application, the touch panel comprises a plurality of third touch areas arranged in an array, any third touch area is defined as a target third touch area, the target third touch area comprises one first touch area and one second touch area;

the first touch area of the target third touch area comprises a plurality of self-capacitance modules, the plurality of self-capacitance modules are independent of each other, the mutual capacitance module is formed between the second touch area and the first touch area.

According to an embodiment of the present application, the first touch area comprises four self-capacitance modules arranged in an array, the second touch area is a complete touch area and independent of the four self-capacitance modules, the mutual capacitance module is formed between the second touch area and the first touch area formed by the four self-capacitance modules.

According to an embodiment of the present application, the plurality of self-capacitance modules are rectangular regions with side lengths of XY respectively, and 2 mm<X<9 mm; 2 mm<Y<9 mm.

According to an embodiment of the present application, in a further aspect, the present application provides a display device, the display device comprises the touch panel as claimed in claim 1, the touch panel comprises:

at least one first touch area, the at least one first touch area comprises a plurality of self-capacitance modules, the plurality of self-capacitance modules are independent of each other;

at least one second touch area, a mutual capacitance module is formed between the at least one second touch area and the at least one first touch area;

a control module, the plurality of self-capacitance modules of the at least one first touch area are electrically connected with the control module through first connecting wires respectively, the at least one second touch area is electrically connected with the control module through second connecting wires;

wherein, a number of the second connecting wires is less than a number of the first connecting wires.

According to an embodiment of the present application, the touch panel comprises one first touch area and one second touch area;

the first touch area comprises four self-capacitance modules arranged in an array, the second touch area is a complete touch area and independent of the four self-capacitance modules, and the mutual capacitance module is formed between the second touch area and the first touch area formed by the four self-capacitance modules.

According to an embodiment of the present application, wherein the touch panel comprises one first touch area and one second touch area;

the second touch area comprises a first sub-touch area and a second sub-touch area, the first sub-touch area and the second sub-touch area are two complete and mutually independent sub-touch areas; and the mutual capacitance module is formed between the first sub-touch area and the first touch area, the mutual capacitance module is formed between the second sub-touch area and the first touch area.

According to an embodiment of the present application, the first touch area comprises four self-capacitance modules arranged in an array, the four self-capacitance modules comprise a first self-capacitance module, a second self-capacitance module, a third self-capacitance module, and a fourth self-capacitance module arranged in an array;

the mutual capacitance module is formed between the first sub-touch area, the first self-capacitance module, and the second self-capacitance module, the mutual capacitance module is formed between the second sub-touch area, the third self-capacitance module, and the fourth self-capacitance module.

According to an embodiment of the present application, the mutual capacitance module is formed between the first sub-touch area and the first self-capacitance module, the mutual capacitance module is formed between the second sub-touch area, the second self-capacitance module, the third self-capacitance module, and the fourth self-capacitance module; or the mutual capacitance module is formed between the first sub-touch area and the fourth self-capacitance module, the mutual capacitance module is formed between the second sub-touch area, the first self-capacitance module, the second self-capacitance module, and the third self-capacitance module.

According to an embodiment of the present application, the touch panel comprises one first touch area and one second touch area;

the second touch area comprises a third sub-touch area, a fourth sub-touch area and a fifth sub-touch area, the third sub-touch area, the fourth sub-touch area, and the fifth sub-touch area are three complete and mutually independent sub-touch areas; and the mutual capacitance module is formed between the third sub-touch area and the first touch area, the mutual capacitance module is formed between the fourth sub-touch area and the first touch area, the mutual capacitance module is formed between the fifth sub-touch area and the first touch area.

According to an embodiment of the present application, the first touch area comprises four self-capacitance modules arranged in an array, the four self-capacitance modules comprise a first self-capacitance module, a second self-capacitance module, a third self-capacitance module, and a fourth self-capacitance module arranged in an array;

the mutual capacitance module is formed between the third sub-touch area and the first self-capacitance module, the mutual capacitance module is formed between the fourth sub-touch area and the second self-capacitance module, the mutual capacitance module is formed between the fifth sub-touch area, the third self-capacitance module, and the fourth self-capacitance module; or the mutual capacitance module is formed between the third sub-touch area and the first self-capacitance module, the mutual capacitance module is formed between the fourth sub-touch area, the second self-capacitance module, and the third self-capacitance module, the mutual capacitance module is formed between the fifth sub-touch area and the fourth self-capacitance module; or the mutual capacitance module is formed between the third sub-touch area, the first self-capacitance module, and the second self-capacitance module, the mutual capacitance module is formed between the fourth sub-touch area and the third self-capacitance module, the mutual capacitance module is formed between the fifth sub-touch area and the fourth self-capacitance module.

According to an embodiment of the present application, the touch panel comprises a plurality of third touch areas arranged in an array, any third touch area is defined as a target third touch area, the target third touch area comprises one first touch area and one second touch area;

the first touch area of the target third touch area comprises a plurality of self-capacitance modules, the plurality of self-capacitance modules are independent of each other, the mutual capacitance module is formed between the second touch area and the first touch area.

According to an embodiment of the present application, the first touch area comprises four self-capacitance modules arranged in an array, the second touch area is a complete touch area and independent of the four self-capacitance modules, the mutual capacitance module is formed between the second touch area and the first touch area formed by the four self-capacitance modules.

According to an embodiment of the present application, the plurality of self-capacitance modules are rectangular regions with side lengths of XY respectively, and 2 mm<X<9 mm; 2 mm<Y<9 mm.

The touch panel and the display device provided by embodiments of the present application include at least one first touch area and at least one second touch area, and the at least one first touch area includes a plurality of self-capacitance modules, and the plurality of self-capacitance modules are independent of each other; a mutual capacitance module is formed between the at least one second touch area and the at least one first touch area; and the plurality of the self-capacitance modules in the at least one first touch area are electrically connected with a control module through first connecting wires respectively, and the at least one second touch area is electrically connected with the control module through second connecting wires; a number of the second connecting wires is less than a number of the first connecting wires. In the present application, a self-capacitance module in an original touch panel is replaced by a mutual capacitance module, and a combination of self-capacitance and mutual capacitance is adopted, which effectively reduces wiring in the touch panel and reduces cost at a same time.

BRIEF DESCRIPTION OF DRAWINGS

To illustrate technical solutions in an embodiment of the present application more clearly, accompanying drawings used in a description of the embodiments are briefly introduced as follows. Obviously, the accompanying drawings in the following description are only some embodiments of the present application. For those skilled in the art, other drawings can also be obtained from these drawings without creative effort.

DETAILED DESCRIPTION OF PREFERRED EMBODIMENTS

Technical solutions in embodiments of the present application will be clearly and completely described below with reference to accompanying drawings in the embodiments of the present application. Obviously, described embodiments are only some, but not all embodiments of the present application. Based on the embodiments of the present application, all other embodiments obtained by those skilled in the art without creative efforts shall fall within protection scope of the present application.

In the description herein, it can be understood that terms such as "center," "longitudinal," "lateral," "length," "width," "thickness," "upper," "lower," "front," "rear," "left," "right," "vertical," "horizontal," "top," "bottom," "inside," "outside," instruct a relationship of orientation or position based on the orientation or positional relationship shown in the accompanying drawings, it is only for convenience of describing the present application and simplifying the description, rather than indicating or implying that a referred device or element has a specific orientation or is constructed and operated in a specific orientation. Therefore, it should not be construed as a limitation of the present application. In the description herein, it should be understood that terms such as "first" and "second" are only used for descriptive purposes and cannot be interpreted as indicating or implying relative importance or implicitly indicating a number of indicated technical features. So, features defined as "first" and "second" may expressly or implicitly include one or more of the features. In the description of the present application, "plurality" means two or more, unless otherwise expressly and specifically defined.

In the present application, the word "exemplary" is used to mean "serving as an example, illustration, or illustration." Any embodiment described in the present application as "exemplary" is not necessarily to be construed as preferred or advantageous over other embodiments. The following description is presented to enable any person skilled in the art to make and use the present application. In the following description, details are set forth for the purpose of explanation. It is to be understood that one of ordinary skill in the art can realize that the present application may be practiced without the use of these specific details. In other instances, well-known structures and procedures have not been described in detail so as not to obscure the description of the present application with unnecessary detail. Therefore, the present application is not intended to limit to the embodiments shown but is to be accorded the widest scope consistent with the principles and features disclosed herein.

Embodiments of the present application provide a touch panel and a display device, which will be described in detail below.

Figure 1:
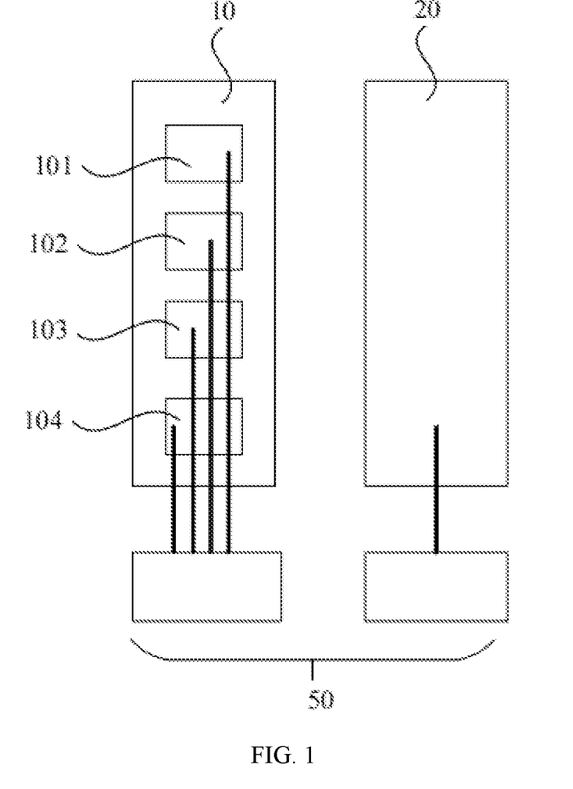
FIG. 1 is a schematic diagram of a touch panel provided by an embodiment of the present application.

As shown in FIG. 1, which is a schematic diagram of a touch panel provided by an embodiment of the present application, the touch panel may include at least one first touch area 10, and the at least one first touch area 10 includes a plurality of self-capacitance modules, and the plurality of the self-capacitance modules are independent of each other. At a same time, it also includes at least one second touch area 20, and a mutual capacitance module is formed between the at least one second touch area 20 and the at least one first touch area 10.

At a same time, the touch panel provided by the embodiments of the present application further includes a control module 50, and the plurality of the self-capacitance modules in the at least one first touch area 10 are electrically connected with the control module through first connecting wires respectively; and the at least one second touch area 20 is connected with the control module 50 through second connecting wires.

Wherein, a number of the second connecting wires is less than a number of the first connecting wires.

The touch panel provided by the embodiments of the present application includes at least one first touch area and at least one second touch area, and the at least one first touch area includes a plurality of self-capacitance modules, and the plurality of self-capacitance modules are independent of each other; a mutual capacitance module is formed between the at least one second touch area and the at least one first touch area; and the plurality of the self-capacitance modules in the at least one first touch area are electrically connected with the control module 50 through first connecting wires respectively, and the at least one second touch area is electrically connected with the control module 50 through second connecting wires; a number of the second connecting wires is less than a number of the first connecting wires. In the present application, a self-capacitance module in an original touch panel is replaced by a mutual capacitance module, and a combination of self-capacitance and mutual capacitance is adopted, which effectively reduces wiring in the touch panel and reduces cost at a same time.

In a specific embodiment shown in FIG. 1, the touch panel may include one first touch area 10 and one second touch area 20; and the first touch area may include four self-capacitance modules 101-104 arranged in an array respectively. The second touch area 20 is a complete touch area independent of the four self-capacitance modules; that is, the second touch area 20 does not include a plurality of self-capacitance modules or other modules, and the second touch area 20 is a complete area. At this time, a mutual capacitance module is formed between the entire second touch area 20 and the first touch area 10 formed by the four self-capacitance modules.

In the embodiment shown in FIG. 1, for the entire touch panel, the first touch area 10 in the touch panel includes a plurality of self-capacitance modules, and the mutual capacitance module is formed between the first touch area 10 and the second touch area 20. In the touch panel provided by the embodiment of the present application, a form of self-capacitance is adopted in some areas, and a form of mutual capacitance is adopted in some areas, and the entire touch panel becomes a structure combining self-capacitance and mutual capacitance. Compared with a touch panel in prior art, connecting wires at an original second touch area 20 are reduced, so that wiring of the entire touch panel is reduced.

Figure 2:
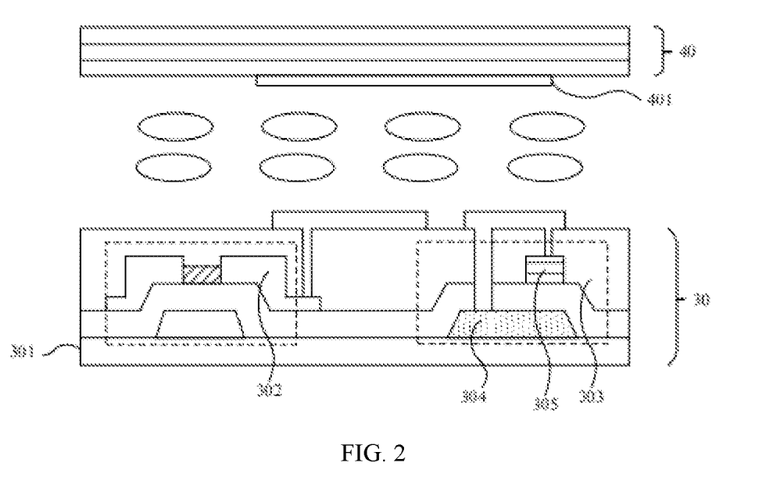
FIG. 2 is a structural schematic diagram of a self-capacitance module in an embodiment of the present application.

As shown in FIG. 2, a structural schematic diagram of a self-capacitance module provided by an embodiment of the present application is shown. For an embodiment of the present application, the touch panel may be not only a VA (vertical alignment) mode panel, but also an IPS (in-plane awitching) or FFS (fringe firld awitching) panel. FIG. 2 shows an actual self-capacitance module in a VA mode panel.

In the embodiment shown in FIG. 2, it may include an array substrate 30, a color filter substrate 40 disposed opposite to the array substrate, and a liquid crystal layer disposed between the array substrate 30 and the color filter substrate 40. In the touch panel provided by the embodiment of the present application, a light source module is disposed on one side of the color filter substrate 40, and a light source enters the touch panel from the side of the color filter substrate 40. This setting is due to that the color filter substrate 40 is provided with a full-surface color filter substrate common electrode layer 401, and the color filter substrate common electrode layer 401 has a shielding effect on capacitance; by disposing the light source module on the side of the color filter substrate, a shielding effect of the color filter substrate common electrode layer 401 on capacitance can be effectively solved.

At a same time, touch structure is mainly integrated in the array substrate 30. Referring to FIG. 2, the array substrate 30 includes a glass substrate 301, a thin film transistor (TFT) 302 disposed above the glass substrate 301, and a sensor module 303 for realizing touch sensing. Wherein, a first sensing layer 304 in the sensor module 303 is a time-division multiplexing module, that is, the first sensing layer 304 is used as a sensing electrode of a sensor during a part time t1 in one frame, and the first sensing layer 304 is used as a common electrode when displaying a picture during a part time t2. Wherein t1+t2=1/f, f is a refresh rate of the touch panel.

In FIG. 2, a gate layer in the thin film transistor 302 and the first sensing layer 304 in the sensor module 303 are prepared above the glass substrate 301; the gate layer and the first sensing layer 304 are disposed in a same layer. A gate insulation layer is also prepared above the gate layer and the first sensing layer 304. A source-drain layer and an active layer are also prepared in a region corresponding to a gate and above the gate insulation layer; and a second sensing layer 305 is prepared in a region corresponding to the first sensing layer 304 and above the gate insulation layer, a connection between the first sensing layer 304 and the second sensing layer 305 is realized through a common electrode ITO (indium tin oxide) as a transition.

It should be noted that FIG. 2 only shows a structural diagram of the self-capacitance module in an embodiment, and the self-capacitance module provided by embodiments of the present application is not limited to FIG. 2; the present application does not limit a specific structure of the self-capacitance module.

Figure 3:
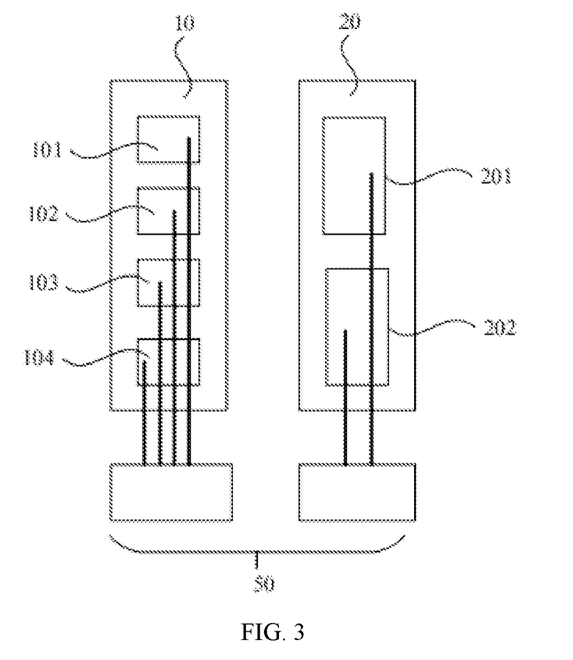
FIG. 3 is a schematic diagram of a touch panel provided by another embodiment of the present application.

As shown in FIG. 3, a schematic diagram of a touch panel provided by another embodiment of the present application is shown. In the embodiment shown in FIG. 3, the touch panel also includes one first touch area 10 and one second touch area 20. At this time, the second touch area 20 includes a first sub-touch area 201 and a second sub-touch area 202;

Moreover, the first sub-touch area 201 and the second sub-touch area 202 are two complete and mutually independent sub-touch areas.

At this time, in the embodiment shown in FIG. 3, the mutual capacitance module is formed between the first sub-touch area 201 and the first touch area 10, and another mutual capacitance module is also formed between the second sub-touch area 202 and the first touch area 10.

It should be noted that, in the embodiment shown in FIG. 3, the first touch area 10 includes a plurality of self-capacitance modules, and may specifically include four self-capacitance modules, which comprises a first self-capacitance module 101, a second self-capacitance module 102, a third self-capacitance module 103, and a fourth self-capacitance module 104 respectively. At this time, the mutual capacitance module is formed between the first sub-touch area 201 and the first touch area 10, which may be: the mutual capacitance module formed between the first sub-touch area 201, the first self-capacitance module 101, and the second self-capacitance module 102. The another mutual capacitance module is formed between the second sub-touch area 202 and the first touch area 10, which may be: the another mutual capacitance module formed between the second sub-touch area 202, the third self-capacitance module 103, and the fourth self-capacitance module 104.

The touch panel in prior art only includes a plurality of self-capacitance modules, while the touch panel in the embodiment of the present application is a structure combining self-capacitance and mutual capacitance. Compared with the prior art, mutual capacitance modules are formed between structures in the second touch area 20 and the plurality of the self-capacitance modules in the first touch area 10 at a same time, which can effectively reduce a number of second connecting wires, so as to reduce wiring in the touch panel.

Taking the embodiment shown in FIG. 1 as an example, the second touch area 20 in the prior art also needs four second connecting wires to be electrically connected with the control module 50, but in FIG. 1, only one second connecting wire is required to be electrically connected with the control module 50. For the embodiment shown in FIG. 3, although the second touch area 20 further includes the first sub-touch area 201 and the second sub-touch area 202, only two second connecting wires are required; compared with the four connecting wires in the prior art, the number of the second connecting wires is also reduced.

Figure 4:
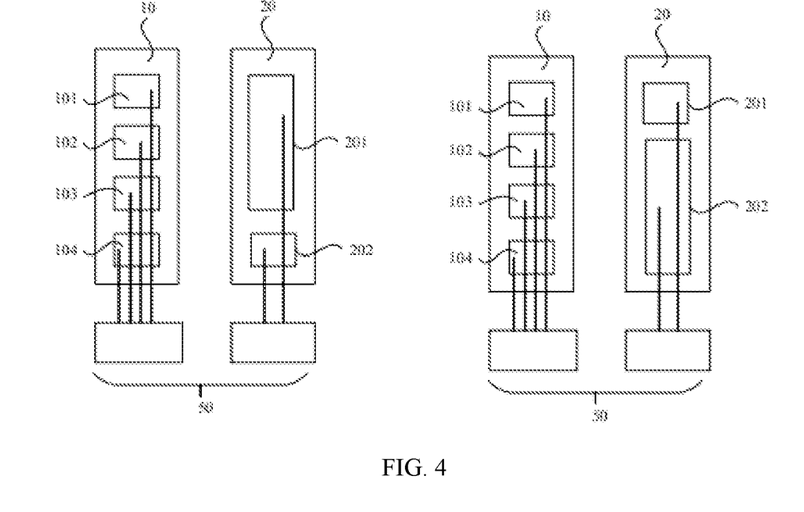
FIG. 4 is a schematic diagram of a touch panel provided by another embodiment of the present application.

As shown in FIG. 4, it is a schematic diagram of a touch panel provided by another embodiment of the present application. In FIG. 4, the touch panel also includes one first touch area 10 and one second touch area 20. At this time, the second touch area 20 includes a first sub-touch area 201 and a second sub-touch area 202; Moreover, the first sub-touch area 201 and the second sub-touch area 202 are two complete and mutually independent sub-touch areas.

The first touch area 10 includes a plurality of self-capacitance modules, specifically, four self-capacitance modules, which comprises a first self-capacitance module 101, a second self-capacitance module 102, a third self-capacitance module 103, and a fourth self-capacitance module.

At this time, a mutual capacitance module is formed between the first sub-touch area 201 and the first touch area 10, which may be: the mutual capacitance module formed between the first sub-touch area 201 and the first self-capacitance module 101. Another mutual capacitance module is formed between the second sub-touch area 202 and the first touch area 10, which may be: the another mutual capacitance module formed between the second sub-touch area 202, the second self-capacitance module 102, the third self-capacitance module 103, and the fourth self-capacitance module 104.

Alternatively, the mutual capacitance module is formed between the first sub-touch area 201, the first self-capacitance module 101, the second self-capacitance module 102, and the third self-capacitance module 103; and the another mutual capacitance module is formed between the second sub-touch area 202 and the fourth self-capacitance module.

Figure 5:
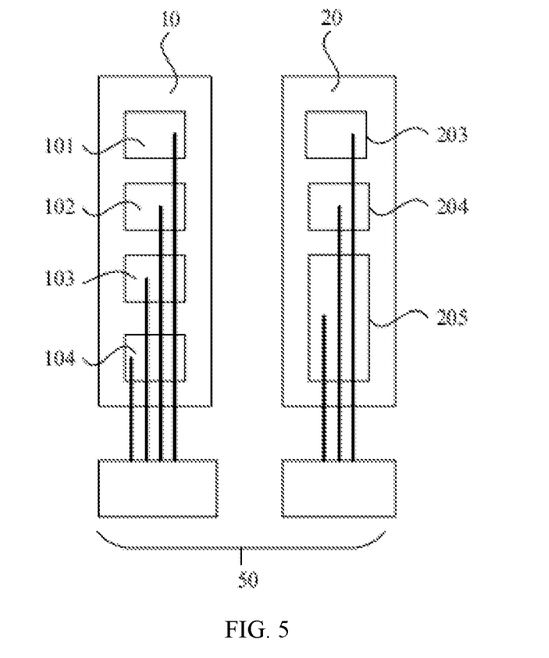
FIG. 5 is a schematic diagram of a touch panel provided by another embodiment of the present application.

As shown in FIG. 5, it is a schematic diagram of a touch panel provided by another embodiment of the present application. In FIG. 5, the touch panel also includes one first touch area 10 and one second touch area 20; however, the second touch area 20 at this time includes three sub-touch areas, which comprises a third sub-touch area 203, a fourth sub-touch area 204, and a fifth sub-touch area 205 respectively. The third sub-touch area 203, the fourth sub-touch area 204, and the fifth sub-touch area 205 are three complete and mutually independent sub-touch areas. And a mutual capacitance module is formed between the third sub-touch area 203 and the first touch area 10, another mutual capacitance module is formed between the fourth sub-touch area 204 and the first touch area 10, and yet another mutual capacitance module is formed between the fifth sub-touch area 205 and the first touch area 10.

In the embodiment shown in FIG. 5, the first touch area 10 includes a plurality of self-capacitance modules, specifically four self-capacitance modules, which comprises a first self-capacitance module 101, a second self-capacitance module 102, a third self-capacitance module 103, and a fourth self-capacitance module 104 respectively.

At this time, a mutual capacitance module is formed between the third sub-touch area 203 and the first touch area 10, which may be: the mutual capacitance module formed between the third sub-touch area 203 and the first self-capacitance module 101. The another mutual capacitance module is formed between the fourth sub-touch area 204 and the first touch area 10, which may be: the another mutual capacitance module is formed between the fourth sub-touch area 204 and the second self-capacitance module 102. The yet another mutual capacitance module is formed between the fifth sub-touch area 205 and the first touch area 10, which may be: the yet another mutual capacitance is formed between the fifth sub-touch area 205, the third self-capacitance module 103, and the fourth self-capacitance module 104.

Figure 6:
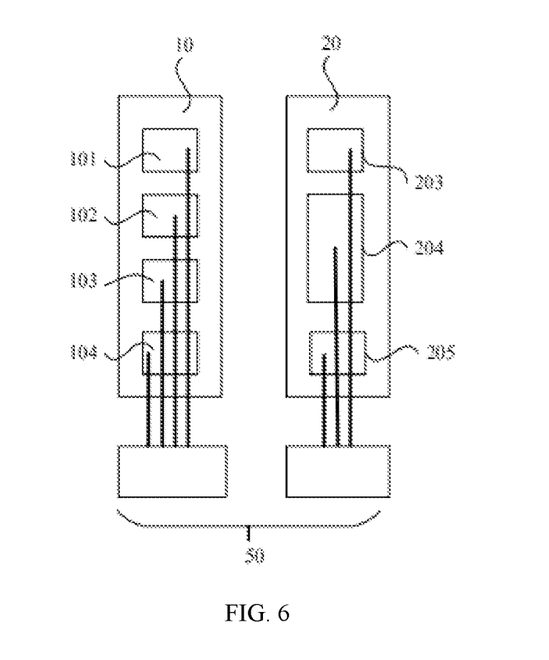
FIG. 6 is a schematic diagram of a touch panel provided by another embodiment of the present application.

As shown in FIG. 6, it is a schematic diagram of a touch panel provided by another embodiment of the present application. A mutual capacitance module is formed between the third sub-touch area 203 and the first touch area 10, which may be: the mutual capacitance module is formed between the third sub-touch area 203 and the first self-capacitance module 101. The another mutual capacitance module is formed between the fourth sub-touch area 204 and the first touch area 10, which may be: the another mutual capacitance module is formed between the fourth sub-touch area 204, the second self-capacitance module 102, and the third self-capacitance module 103. The yet another mutual capacitance module is formed between the fifth sub-touch area 205 and the first touch area 10, which may be: the yet another mutual capacitance module is formed between the fifth sub-touch area 205 and the fourth self-capacitance module 104.

Figure 7:
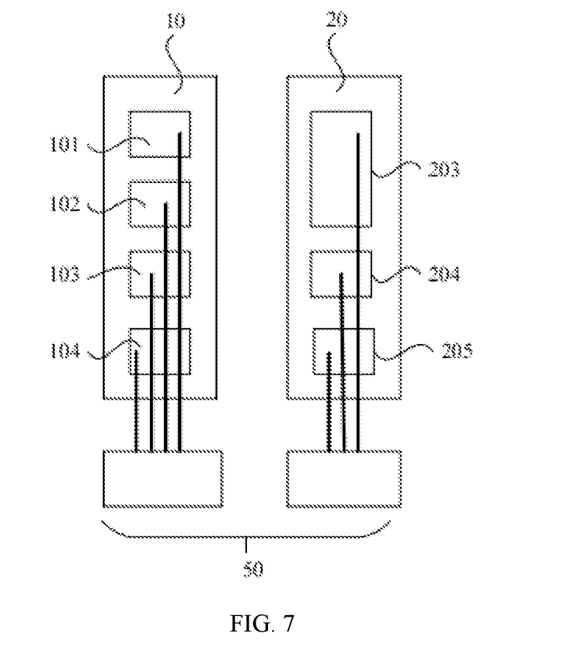
FIG. 7 is a schematic diagram of a touch panel provided by another embodiment of the present application.

As shown in FIG. 7, it is a schematic diagram of a touch panel provided by another embodiment of the present application. A mutual capacitance module is formed between the third sub-touch area 203 and the first touch area 10, which may be: the mutual capacitance module is formed between the third sub-touch area 203, the first self-capacitance module 101, and the second self-capacitance module 102. The another mutual capacitance module is formed between the fourth sub-touch area 204 and the first touch area 10, which may be: the another mutual capacitance module is formed between the fourth sub-touch area 204 and the third self-capacitance module 103. The yet another mutual capacitance module is formed between the fifth sub-touch area 205 and the first touch area 10, which may be: the yet another mutual capacitance module is formed between the fifth sub-touch area 205 and the fourth self-capacitance module 104.

Figure 8:
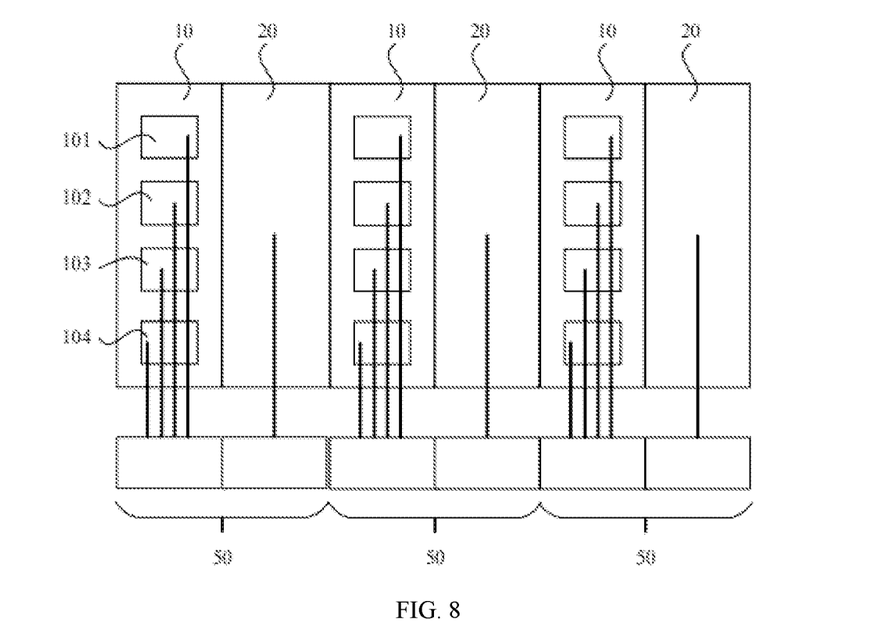
FIG. 8 is a schematic diagram of a touch panel provided by another embodiment of the present application.

As shown in FIG. 8, it is a schematic diagram of a touch panel provided by another embodiment of the present application. In the embodiment shown in FIG. 8, the touch panel includes a plurality of third touch areas arranged in an array, and any third touch area is defined as a target third touch area, and the target third touch area includes one first touch area 10 and one second touch area 20. That is, in the embodiment shown in FIG. 8, the touch panel includes a plurality of first touch areas 10 and a plurality of second touch areas 20.

In the embodiment shown in FIG. 8, the first touch area 10 in the target third touch area also includes a plurality of self-capacitance modules, and the plurality of the self-capacitance modules are independent of each other; and a mutual capacitance module is formed between the second touch area 20 and the first touch area 10. The plurality of the self-capacitance modules in the target third touch area are electrically connected with the control module 50 through a plurality of first connecting wires respectively, and the second touch area 20 in the target third touch area is electrically connected with the control module 50 through a plurality of second connecting wires. And a number of the second connecting wires is less than a number of the first connecting wires.

Specifically, the first touch area 10 in the target third touch area may include four self-capacitance modules arranged in an array, and the second touch area 20 is a complete and independent touch area of four self-capacitance modules. At this time, a mutual capacitance module is formed between the second touch area 20 and the first touch area formed by the four self-capacitance modules.

Figure 9:
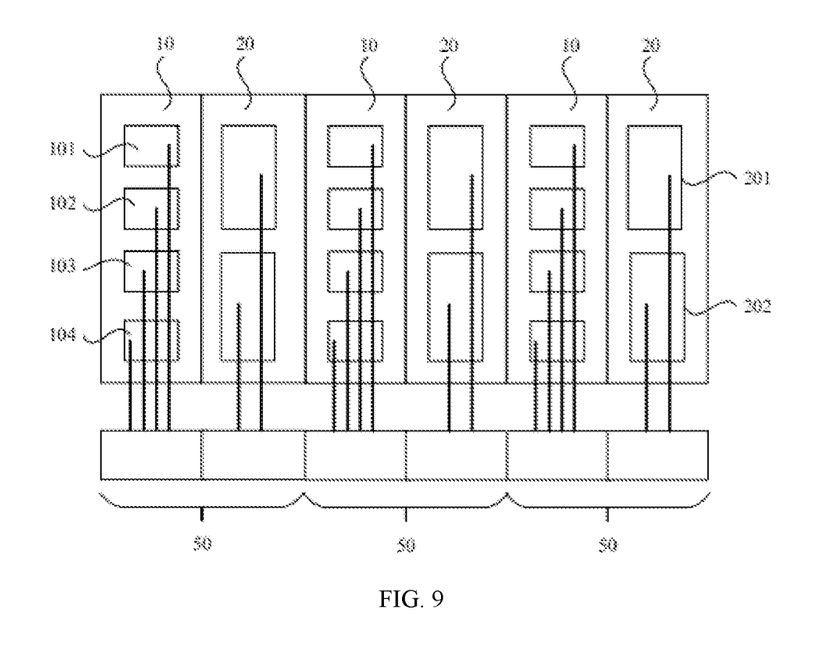
FIG. 9 is a schematic diagram of a touch panel provided by another embodiment of the present application.

As shown in FIG. 9, it is a schematic diagram of a touch panel provided by another embodiment of the present application. In FIG. 9, the target third touch area 10 includes four self-capacitance modules arranged in an array, which comprises a first self-capacitance module 101, a second self-capacitance module 102, a third self-capacitance module 103, and a fourth self-capacitance module 104; and the second touch area 20 may include a first sub-touch area 201 and a second sub-touch area 202. At this time, the mutual capacitance module may be formed between the first sub-touch area 201, the first self-capacitance module 101, and the second self-capacitance module 102; the self-capacitance module can be formed between the second sub-touch area 202, the third self-capacitance module 103, and the fourth self-capacitance module 104.

It should be noted that the touch panel shown in FIG. 9 is only a touch panel provided by the embodiments of the present application; When the touch panel includes a plurality of first touch areas 10 and a plurality of second touch areas 20, a mutual capacitance structure formed between the plurality of the first touch areas 10 and the plurality of the second touch areas 20 can be referred to the foregoing, a description when only one first touch area 10 and one second touch area 20 are included, and will not be repeated here.

It should be noted that, in the embodiments of the present application, an area of the second touch area 20 is generally same as an area of the first touch area. In this way, on a premise of not changing an overall distribution of a touch area, a combination of self-capacitance and mutual capacitance can reduce an overall number of wiring on the touch panel.

For the touch panel, a realization of a touch function mainly lies in determining a position coordinate when touch action occurs. However, for the touch panel of combining self-capacitance and mutual capacitance provided by the present application, the position coordinate can be determined in a self-integration manner when touch action occurs.

Specifically, when the touch action occurs in the first touch area 10, coordinates can be determined according to a self-capacitance method in the prior art. When the touch action occurs in the second touch area 20, horizontal coordinate, that is, coordinate in an X direction can be determined by means of self-capacitance, and vertical ordinate, that is, coordinate in an Y direction can be determined by a size of mutual capacitance between the second touch area 20 and the first touch area 10.

In an embodiment of the present application, a sensing area corresponding to the plurality of the self-capacitance modules 101-104 is generally $2 \text{ mm} < X < 9 \text{ mm}$; $2 \text{ mm} < Y < 9 \text{ mm}$. That is, the plurality of the self-capacitance modules 101-104 are rectangular regions with side lengths of XY respectively, and $2 \text{ mm} < X < 9 \text{ mm}$; $2 \text{ mm} < Y < 9 \text{ mm}$. At a same time, a highly integrated touch and display driver integrated chip (Touch and Display Driver Integration, TDDI) can be used in the embodiments of the present application; The TDDI chip can use time-sharing processing for display and touch, effectively solving a problem of signal crosstalk between touch and display.

Embodiments of the present application further provide a display device, wherein the display device includes the touch panel described in any one of above. Specifically, as shown in FIG. 1, which is a schematic diagram of a touch panel provided by another embodiment of the present application, the touch panel may include at least one first touch area 10, and the at least one first touch area 10 includes a plurality of self-capacitance modules, the plurality of the self-capacitance modules are independent of each other. At a same time, it also includes at least one second touch area 20, and a mutual capacitance module is formed between the at least one second touch area 20 and the at least one first touch area 10.

At a same time, the touch panel provided by the embodiments of the present application further includes a control module 50, and the plurality of the self-capacitance modules in the at least one first touch area 10 are electrically connected with the control module through first connecting wires respectively; and the at least one second touch area 20 is connected with the control module 50 through second connecting wires.

Wherein, a number of the second connecting wires is less than a number of the first connecting wires.

The touch panel provided by the embodiments of the present application includes at least one first touch area and at least one second touch area, and the at least one first touch area includes a plurality of self-capacitance modules, and the plurality of self-capacitance modules are independent of each other; a mutual capacitance module is formed between the at least one second touch area and the at least one first touch area; and the plurality of the self-capacitance modules in the at least one first touch area are electrically connected with the control module 50 through first connecting wires respectively, and the at least one second touch area is electrically connected with the control module 50 through second connecting wires; a number of the second connecting wires is less than a number of the first connecting wires. In the present application, a self-capacitance module in an original touch panel is replaced by a mutual capacitance module, and a combination of self-capacitance and mutual capacitance is adopted, which effectively reduces wiring in the touch panel and reduces cost at a same time.

In a specific embodiment shown in FIG. 1, the touch panel may include one first touch area 10 and one second touch area 20; and the first touch area may include four self-capacitance modules 101-104 arranged in an array respectively. The second touch area 20 is a complete touch area independent of the four self-capacitance modules; that is, the second touch area 20 does not include a plurality of self-capacitance modules or other modules, and the second touch area 20 is a complete area. At this time, a mutual capacitance module is formed between the entire second touch area 20 and the first touch area 10 formed by the four self-capacitance modules.

In the embodiment shown in FIG. 1, for the entire touch panel, the first touch area 10 in the touch panel includes a plurality of self-capacitance modules, and the mutual capacitance module is formed between the first touch area 10 and the second touch area 20. In the touch panel provided by the embodiment of the present application, a form of self-capacitance is adopted in some areas, and a form of mutual capacitance is adopted in some areas, and the entire touch panel becomes a structure combining self-capacitance and mutual capacitance. Compared with a touch panel in prior art, connecting wires at an original second touch area 20 are reduced, so that wiring of the entire touch panel is reduced.

As shown in FIG. 2, a structural schematic diagram of a self-capacitance module provided by an embodiment of the present application is shown. For an embodiment of the present application, the touch panel may be not only a VA (vertical alignment) mode panel, but also an IPS (in-plane awitching) or FFS (fringe firld awitching) panel. FIG. 2 shows an actual self-capacitance module in a VA mode panel.

In the embodiment shown in FIG. 2, it may include an array substrate 30, a color filter substrate 40 disposed opposite to the array substrate, and a liquid crystal layer disposed between the array substrate 30 and the color filter substrate 40. In the touch panel provided by the embodiment of the present application, a light source module is disposed on one side of the color filter substrate 40, and a light source enters the touch panel from the side of the color filter substrate 40. This setting is due to that the color filter substrate 40 is provided with a full-surface color filter substrate common electrode layer 401, and the color filter substrate common electrode layer 401 has a shielding effect on capacitance; by disposing the light source module on the side of the color filter substrate, a shielding effect of the color filter substrate common electrode layer 401 on capacitance can be effectively solved.

At a same time, touch structure is mainly integrated in the array substrate 30. Referring to FIG. 2, the array substrate 30 includes a glass substrate 301, a thin film transistor (TFT) 302 disposed above the glass substrate 301, and a sensor module 303 for realizing touch sensing. Wherein, a first sensing layer 304 in the sensor module 303 is a time-division multiplexing module, that is, the first sensing layer 304 is used as a sensing electrode of a sensor during a part time t1 in one frame, and the first sensing layer 304 is used as a common electrode when displaying a picture during a part time t2. Wherein t1+2=1/f, f is a refresh rate of the touch panel.

In FIG. 2, a gate layer in the thin film transistor 302 and the first sensing layer 304 in the sensor module 303 are prepared above the glass substrate 301; the gate layer and the first sensing layer 304 are disposed in a same layer. A gate insulation layer is also prepared above the gate layer and the first sensing layer 304. A source-drain layer and an active layer are also prepared in a region corresponding to a gate and above the gate insulation layer, and a second sensing layer 305 is prepared in a region corresponding to the first sensing layer 304 and above the gate insulation layer, a connection between the first sensing layer 304 and the second sensing layer 305 is realized through a common electrode ITO (indium tin oxide) as a transition.

It should be noted that FIG. 2 only shows a structural diagram of the self-capacitance module in an embodiment, and the self-capacitance module provided by embodiments of the present application is not limited to FIG. 2; the present application does not limit a specific structure of the self-capacitance module.

As shown in FIG. 3, a schematic diagram of a touch panel provided by another embodiment of the present application is shown. In the embodiment shown in FIG. 3, the touch panel also includes one first touch area 10 and one second touch area 20. At this time, the second touch area 20 includes a first sub-touch area 201 and a second sub-touch area 202; Moreover, the first sub-touch area 201 and the second sub-touch area 202 are two complete and mutually independent sub-touch areas.

At this time, in the embodiment shown in FIG. 3, the mutual capacitance module is formed between the first sub-touch area 201 and the first touch area 10, and another mutual capacitance module is also formed between the second sub-touch area 202 and the first touch area 10.

It should be noted that, in the embodiment shown in FIG. 3, the first touch area 10 includes a plurality of self-capacitance modules, and may specifically include four self-capacitance modules, which comprises a first self-capacitance module 101, a second self-capacitance module 102, a third self-capacitance module 103, and a fourth self-capacitance module 104 respectively. At this time, the mutual capacitance module is formed between the first sub-touch area 201 and the first touch area 10, which may be: the mutual capacitance module formed between the first sub-touch area 201, the first self-capacitance module 101, and the second self-capacitance module 102. The another mutual capacitance module is formed between the second sub-touch area 202 and the first touch area 10, which may be: the another mutual capacitance module formed between the second sub-touch area 202, the third self-capacitance module 103, and the fourth self-capacitance module 104.

The touch panel in prior art only includes a plurality of self-capacitance modules, while the touch panel in the embodiment of the present application is a structure combining self-capacitance and mutual capacitance. Compared with the prior art, mutual capacitance modules are formed between structures in the second touch area 20 and the plurality of the self-capacitance modules in the first touch area 10 at a same time, which can effectively reduce a number of second connecting wires, so as to reduce wiring in the touch panel.

Taking the embodiment shown in FIG. 1 as an example, the second touch area 20 in the prior art also needs four second connecting wires to be electrically connected with the control module 50, but in FIG. 1, only one second connecting wire is required to be electrically connected with the control module 50. For the embodiment shown in FIG. 3, although the second touch area 20 further includes the first sub-touch area 201 and the second sub-touch area 202, only two second connecting wires are required; compared with the four connecting wires in the prior art, the number of the second connecting wires is also reduced.

As shown in FIG. 4, it is a schematic diagram of a touch panel provided by another embodiment of the present application. In FIG. 4, the touch panel also includes one first touch area 10 and one second touch area 20. At this time, the second touch area 20 includes a first sub-touch area 201 and a second sub-touch area 202; Moreover, the first sub-touch area 201 and the second sub-touch area 202 are two complete and mutually independent sub-touch areas.

The first touch area 10 includes a plurality of self-capacitance modules, specifically, four self-capacitance modules, which comprises a first self-capacitance module 101, a second self-capacitance module 102, a third self-capacitance module 103, and a fourth self-capacitance module.

At this time, a mutual capacitance module is formed between the first sub-touch area 201 and the first touch area 10, which may be: the mutual capacitance module formed between the first sub-touch area 201 and the first self-capacitance module 101. Another mutual capacitance module is formed between the second sub-touch area 202 and the first touch area 10, which may be: the another mutual capacitance module formed between the second sub-touch area 202, the second self-capacitance module 102, the third self-capacitance module 103, and the fourth self-capacitance module 104.

Alternatively, the mutual capacitance module is formed between the first sub-touch area 201, the first self-capacitance module 101, the second self-capacitance module 102, and the third self-capacitance module 103; and the another mutual capacitance module is formed between the second sub-touch area 202 and the fourth self-capacitance module.

As shown in FIG. 5, it is a schematic diagram of a touch panel provided by another embodiment of the present application. In FIG. 5, the touch panel also includes one first touch area 10 and one second touch area 20; however, the second touch area 20 at this time includes three sub-touch areas, which comprises a third sub-touch area 203, a fourth sub-touch area 204, and a fifth sub-touch area 205 respectively. The third sub-touch area 203, the fourth sub-touch area 204, and the fifth sub-touch area 205 are three complete and mutually independent sub-touch areas. And a mutual capacitance module is formed between the third sub-touch area 203 and the first touch area 10, another mutual capacitance module is formed between the fourth sub-touch area 204 and the first touch area 10, and yet another mutual capacitance module is formed between the fifth sub-touch area 205 and the first touch area 10.

In the embodiment shown in FIG. 5, the first touch area 10 includes a plurality of self-capacitance modules, specifically four self-capacitance modules, which comprises a first self-capacitance module 101, a second self-capacitance module 102, a third self-capacitance module 103, and a fourth self-capacitance module 104 respectively.

At this time, a mutual capacitance module is formed between the third sub-touch area 203 and the first touch area 10, which may be: the mutual capacitance module formed between the third sub-touch area 203 and the first self-capacitance module 101. The another mutual capacitance module is formed between the fourth sub-touch area 204 and the first touch area 10, which may be: the another mutual capacitance module is formed between the fourth sub-touch area 204 and the second self-capacitance module 102. The yet another mutual capacitance module is formed between the fifth sub-touch area 205 and the first touch area 10, which may be: the yet another mutual capacitance is formed between the fifth sub-touch area 205, the third self-capacitance module 103, and the fourth self-capacitance module 104.

As shown in FIG. 6, it is a schematic diagram of a touch panel provided by another embodiment of the present application. A mutual capacitance module is formed between the third sub-touch area 203 and the first touch area 10, which may be: the mutual capacitance module is formed between the third sub-touch area 203 and the first self-capacitance module 101. The another mutual capacitance module is formed between the fourth sub-touch area 204 and the first touch area 10, which may be: the another mutual capacitance module is formed between the fourth sub-touch area 204, the second self-capacitance module 102, and the third self-capacitance module 103. The yet another mutual capacitance module is formed between the fifth sub-touch area 205 and the first touch area 10, which may be: the yet another mutual capacitance module is formed between the fifth sub-touch area 205 and the fourth self-capacitance module 104.

As shown in FIG. 7, it is a schematic diagram of a touch panel provided by another embodiment of the present application. A mutual capacitance module is formed between the third sub-touch area 203 and the first touch area 10, which may be: the mutual capacitance module is formed between the third sub-touch area 203, the first self-capacitance module 101, and the second self-capacitance module 102. The another mutual capacitance module is formed between the fourth sub-touch area 204 and the first touch area 10, which may be: the another mutual capacitance module is formed between the fourth sub-touch area 204 and the third self-capacitance module 103. The yet another mutual capacitance module is formed between the fifth sub-touch area 205 and the first touch area 10, which may be: the yet another mutual capacitance module is formed between the fifth sub-touch area 205 and the fourth self-capacitance module 104.

As shown in FIG. 8, it is a schematic diagram of a touch panel provided by another embodiment of the present application. In the embodiment shown in FIG. 8, the touch panel includes a plurality of third touch areas arranged in an array, and any third touch area is defined as a target third touch area, and the target third touch area includes one first touch area 10 and one second touch area 20. That is, in the embodiment shown in FIG. 8, the touch panel includes a plurality of first touch areas 10 and a plurality of second touch areas 20.

In the embodiment shown in FIG. 8, the first touch area 10 in the target third touch area also includes a plurality of self-capacitance modules, and the plurality of the self-capacitance modules are independent of each other; and a mutual capacitance module is formed between the second touch area 20 and the first touch area 10. The plurality of the self-capacitance modules in the target third touch area are electrically connected with the control module 50 through a plurality of first connecting wires respectively, and the second touch area 20 in the target third touch area is electrically connected with the control module 50 through a plurality of second connecting wires. And a number of the second connecting wires is less than a number of the first connecting wires.

Specifically, the first touch area 10 in the target third touch area may include four self-capacitance modules arranged in an array, and the second touch area 20 is a complete and independent touch area of four self-capacitance modules. At this time, a mutual capacitance module is formed between the second touch area 20 and the first touch area formed by the four self-capacitance modules.

As shown in FIG. 9, it is a schematic diagram of a touch panel provided by another embodiment of the present application. In FIG. 9, the target third touch area 10 includes four self-capacitance modules arranged in an array, which comprises a first self-capacitance module 101, a second self-capacitance module 102, a third self-capacitance module 103, and a fourth self-capacitance module 104; and the second touch area 20 may include a first sub-touch area 201 and a second sub-touch area 202. At this time, the mutual capacitance module may be formed between the first sub-touch area 201, the first self-capacitance module 101, and the second self-capacitance module 102; the self-capacitance module can be formed between the second sub-touch area 202, the third self-capacitance module 103, and the fourth self-capacitance module 104.

It should be noted that the touch panel shown in FIG. 9 is only a touch panel provided by the embodiments of the present application; When the touch panel includes a plurality of first touch areas 10 and a plurality of second touch areas 20, a mutual capacitance structure formed between the plurality of the first touch areas 10 and the plurality of the second touch areas 20 can be referred to the foregoing, a description when only one first touch area 10 and one second touch area 20 are included, and will not be repeated here.

It should be noted that, in the embodiments of the present application, an area of the second touch area 20 is generally same as an area of the first touch area. In this way, on a premise of not changing an overall distribution of a touch area, a combination of self-capacitance and mutual capacitance can reduce an overall number of wiring on the touch panel.

For the touch panel, a realization of a touch function mainly lies in determining a position coordinate when touch action occurs. However, for the touch panel of combining self-capacitance and mutual capacitance provided by the present application, the position coordinate can be determined in a self-integration manner when touch action occurs.

Specifically, when the touch action occurs in the first touch area 10, coordinates can be determined according to a self-capacitance method in the prior art. When the touch action occurs in the second touch area 20, horizontal coordinate, that is, coordinate in an X direction can be determined by means of self-capacitance, and vertical ordinate, that is, coordinate in an Y direction can be determined by a size of mutual capacitance between the second touch area 20 and the first touch area 10.

In an embodiment of the present application, a sensing area corresponding to the plurality of the self-capacitance modules 101-104 is generally 2 mm<X<9 mm; 2 mm<Y<9 mm. That is, the plurality of the self-capacitance modules 101-104 are rectangular regions with side lengths of XY respectively, and 2 mm<X<9 mm; 2 mm<Y<9 mm. At a same time, a highly integrated touch and display driver integrated chip (Touch and Display Driver Integration, TDDI) can be used in the embodiments of the present application; The TDDI chip can use time-sharing processing for display and touch, effectively solving a problem of signal crosstalk between touch and display.

The touch panel and the display device provided by the embodiments of the present application are described in detail above. Specific examples are used in this paper to illustrate principles and implementations of this disclosure, description of the above embodiments is only used to help understand method of this disclosure and its core idea; meanwhile, for those skilled in the art, according to idea of this disclosure, there will be changes in specific embodiments and scope of application, in conclusion, contents of this specification should not be construed as limiting this disclosure.

What is claimed is:

1. A touch panel, wherein the touch panel comprises:
at least one first touch area, wherein the at least one first touch area comprises a plurality of self-capacitance modules, the plurality of the self-capacitance modules are independent of each other;
at least one second touch area, wherein a mutual capacitance module is formed between the at least one second touch area and the at least one first touch area; and
a control module, wherein the plurality of self-capacitance modules of the at least one first touch area are electrically connected with the control module through first connecting wires respectively, and the at least one second touch area is electrically connected with the control module through second connecting wires; and
the control module is configured to determine a horizontal coordinate of a position at which a touch action occurs by means of a self-capacitance obtained by the at least one first touch area, and to determine a vertical coordinate of the position by a mutual capacitance between the at least one first touch area and the at least one second touch area, when the touch action occurs in the at least one second touch area;
wherein, a number of the second connecting wires is less than a number of the first connecting wires.

2. The touch panel as claimed in claim 1, wherein the touch panel comprises one first touch area and one second touch area;
the first touch area comprises four self-capacitance modules arranged in an array, the second touch area is a complete touch area and independent of the four self-capacitance modules, and the mutual capacitance module is formed between the second touch area and the first touch area formed by the four self-capacitance modules.

3. The touch panel as claimed in claim 1, wherein the touch panel comprises one first touch area and one second touch area;
the second touch area comprises a first sub-touch area and a second sub-touch area, the first sub-touch area and the second sub-touch area are two complete and mutually independent sub-touch areas; and the mutual capacitance module is formed between the first sub-touch area and the first touch area, another mutual capacitance module is formed between the second sub-touch area and the first touch area.

4. The touch panel as claimed in claim 3, wherein the first touch area comprises four self-capacitance modules arranged in an array, the four self-capacitance modules comprise a first self-capacitance module, a second self-capacitance module, a third self-capacitance module, and a fourth self-capacitance module arranged in an array;
the mutual capacitance module is formed between the first sub-touch area, the first self-capacitance module, and the second self-capacitance module, and the another mutual capacitance module is formed between the second sub-touch area, the third self-capacitance module, and the fourth self-capacitance module.

5. The touch panel as claimed in claim 3, wherein the first touch area comprises four self-capacitance modules arranged in an array, the four self-capacitance modules comprise a first self-capacitance module, a second self-capacitance module, a third self-capacitance module, and a fourth self-capacitance module arranged in an array respectively;

the mutual capacitance module is formed between the first sub-touch area and the first self-capacitance module, and the another mutual capacitance module is formed between the second sub-touch area, the second self-capacitance module, the third self-capacitance module, and the fourth self-capacitance module.

6. The touch panel as claimed in claim 3, wherein the first touch area comprises four self-capacitance modules arranged in an array, the four self-capacitance modules comprise a first self-capacitance module, a second self-capacitance module, a third self-capacitance module, and a fourth self-capacitance module arranged in an array respectively;

the mutual capacitance module is formed between the first sub-touch area and the fourth self-capacitance module, and the another mutual capacitance module is formed between the second sub-touch area, the first self-capacitance module, the second self-capacitance module, and the third self-capacitance module.

7. The touch panel as claimed in claim 1, wherein the touch panel comprises one first touch area and one second touch area;

the second touch area comprises a third sub-touch area, a fourth sub-touch area, and a fifth sub-touch area; the third sub-touch area, the fourth sub-touch area, and the fifth sub-touch area are three complete and mutually independent sub-touch areas; and the mutual capacitance module is formed between the third sub-touch area and the first touch area, another mutual capacitance module is formed between the fourth sub-touch area and the first touch area, and yet another mutual capacitance module is formed between the fifth sub-touch area and the first touch area.

8. The touch panel as claimed in claim 7, wherein the first touch area comprises four self-capacitance modules arranged in an array, the four self-capacitance modules comprise a first self-capacitance module, a second self-capacitance module, a third self-capacitance module, and a fourth self-capacitance module arranged in an array respectively;

the mutual capacitance module is formed between the third sub-touch area and the first self-capacitance module, another mutual capacitance module is formed between the fourth sub-touch area and the second self-capacitance module, and yet another mutual capacitance module is formed between the fifth sub-touch area, the third self-capacitance module, and the fourth self-capacitance module.

9. The touch panel as claimed in claim 7, wherein the first touch area comprises four self-capacitance modules arranged in an array, the four self-capacitance modules comprise a first self-capacitance module, a second self-capacitance module, a third self-capacitance module, and a fourth self-capacitance module arranged in an array respectively;

the mutual capacitance module is formed between the third sub-touch area and the first self-capacitance module, another mutual capacitance module is formed between the fourth sub-touch area, the second self-capacitance module, and the third self-capacitance module, and yet another mutual capacitance module is formed between the fifth sub-touch area and the fourth self-capacitance module.

10. The touch panel as claimed in claim 7, wherein the first touch area comprises four self-capacitance modules arranged in an array, the four self-capacitance modules comprise a first self-capacitance module, a second self-capacitance module, a third self-capacitance module, and a fourth self-capacitance module arranged in an array respectively;

the mutual capacitance module is formed between the third sub-touch area, the first self-capacitance module, and the second self-capacitance module, another mutual capacitance module is formed between the fourth sub-touch area and the third self-capacitance module, and yet another mutual capacitance module is formed between the fifth sub-touch area and the fourth self-capacitance module.

11. The touch panel as claimed in claim 1, wherein the touch panel comprises a plurality of third touch areas arranged in an array, any third touch area is defined as a target third touch area, the target third touch area comprises one first touch area and one second touch area;

the first touch area of the target third touch area comprises a plurality of self-capacitance modules, the plurality of self-capacitance modules are independent of each other, and the mutual capacitance module is formed between the second touch area and the first touch area.

12. The touch panel as claimed in claim 11, wherein the first touch area comprises four self-capacitance modules arranged in an array, the second touch area is a complete and independent touch area of the four self-capacitance modules, and the mutual capacitance module is formed between the second touch area and the first touch area formed by the four self-capacitance modules.

13. The touch panel as claimed in claim 1, wherein the plurality of self-capacitance modules are rectangular regions with side lengths of XY respectively, and 2 mm<X<9 mm; 2 mm<Y<9 mm.

14. A display device, wherein the display device comprises a touch panel, wherein the touch panel comprises:

at least one first touch area, wherein the at least one first touch area comprises a plurality of self-capacitance modules, the plurality of the self-capacitance modules are independent of each other;

at least one second touch area, wherein a mutual capacitance module is formed between the at least one second touch area and the at least one first touch area; and a control module, wherein the plurality of self-capacitance modules of the at least one first touch area are electrically connected with the control module through first connecting wires respectively, and the at least one second touch area is electrically connected with the control module through second connecting wires; and the control module is configured to determine a horizontal coordinate of a position at which a touch action occurs by means of a self-capacitance obtained by the at least one first touch area, and to determine a vertical ordinate of the position by a mutual capacitance between the at least one first touch area and the at least one second touch area, when the touch action occurs in the at least one second touch area;

wherein, a number of the second connecting wires is less than a number of the first connecting wires.

15. The display device as claimed in claim 14, wherein touch panel comprises one first touch area and one second touch area;

the first touch area comprises four self-capacitance modules arranged in an array, the second touch area is a complete touch area and independent of the four self-capacitance modules, and the mutual capacitance module is formed between the second touch area and the first touch area formed by the four self-capacitance modules.

16. The display device as claimed in claim 14, wherein the touch panel comprises one first touch area and one second touch area;

the second touch area comprises a first sub-touch area and a second sub-touch area, the first sub-touch area and the second sub-touch area are two complete and mutually independent sub-touch areas; and the mutual capacitance module is formed between the first sub-touch area and the first touch area, another mutual capacitance module is formed between the second sub-touch area and the first touch area.

17. The display device as claimed in claim 16, wherein the first touch area comprises four self-capacitance modules arranged in an array, the four self-capacitance modules comprise a first self-capacitance module, a second self-capacitance module, a third self-capacitance module, and a fourth self-capacitance module arranged in an array respectively;

the mutual capacitance module is formed between the first sub-touch area, the first self-capacitance module, and the second self-capacitance module, and the another mutual capacitance module is formed between the second sub-touch area, the third self-capacitance module, and the fourth self-capacitance module.

18. The display device as claimed in claim 16, wherein the first touch area comprises four self-capacitance modules arranged in an array, the four self-capacitance modules comprise a first self-capacitance module, a second self-capacitance module, a third self-capacitance module, and a fourth self-capacitance module arranged in an array respectively;

the mutual capacitance module is formed between the first sub-touch area and the first self-capacitance module, and the another mutual capacitance module is formed between the second sub-touch area, the second self-capacitance module, the third self-capacitance module, and the fourth self-capacitance module.

19. The display device as claimed in claim 16, wherein the first touch area comprises four self-capacitance modules arranged in an array, the four self-capacitance modules comprise a first self-capacitance module, a second self-capacitance module, a third self-capacitance module, and a fourth self-capacitance module arranged in an array respectively;

the mutual capacitance module is formed between the first sub-touch area and the fourth self-capacitance module, and the another mutual capacitance module is formed between the second sub-touch area, the first self-capacitance module, the second self-capacitance module, and the third self-capacitance module.

20. The display device as claimed in claim 14, wherein the touch panel comprises one first touch area and one second touch area;

the second touch area comprises a third sub-touch area, a fourth sub-touch area, and a fifth sub-touch area; the third sub-touch area, the fourth sub-touch area, and the fifth sub-touch area are three complete and mutually independent sub-touch areas; and the mutual capacitance module is formed between the third sub-touch area and the first touch area, another mutual capacitance module is formed between the fourth sub-touch area and the first touch area, and yet another mutual capacitance module is formed between the fifth sub-touch area and the first touch area.

* * * * *